United States Patent [19]

Messina

[11] Patent Number: 5,175,989
[45] Date of Patent: Jan. 5, 1993

[54] APPARATUS FOR AVOIDING TORQUE BUILD-UPS IN DEPLOYING OCEAN CABLE

[75] Inventor: Frank D. Messina, New Providence, N.J.

[73] Assignee: AT&T Bell Laboratories, Murray Hill, N.J.

[21] Appl. No.: 546,174

[22] Filed: Jun. 29, 1990

[51] Int. Cl.⁵ .............................. D07B 1/06; F16L 1/12
[52] U.S. Cl. ........................................ 57/213; 57/212; 57/217; 254/134.3 SC; 405/168.1
[58] Field of Search ................. 57/202, 213, 207, 212, 57/217, 219; 254/134.35 C; 403/300; 405/166, 168.1

[56] References Cited

U.S. PATENT DOCUMENTS

| | | | |
|---|---|---|---|
| 2,348,100 | 5/1944 | Wadsworth | 403/300 X |
| 2,526,740 | 10/1950 | Gilmore | 57/202 X |
| 3,015,205 | 2/1962 | Massot et al. | 57/213 X |
| 3,274,846 | 8/1966 | Forster | 57/213 X |
| 3,339,012 | 8/1967 | Hutchins | 57/213 X |
| 3,573,346 | 4/1971 | Appleby | 403/267 X |
| 3,786,554 | 1/1974 | Little | 403/268 X |
| 3,813,772 | 6/1974 | Adams | 57/215 X |
| 3,858,992 | 1/1975 | Eucker | 403/214 |
| 4,129,468 | 12/1978 | Knab | 57/13 X |
| 4,441,309 | 4/1984 | Weinraub | 57/212 |
| 4,714,110 | 12/1987 | Dysarz | 403/165 X |

Primary Examiner—Daniel P. Stodola
Assistant Examiner—William Stryjewski
Attorney, Agent, or Firm—Charles E. Graves

[57] ABSTRACT

A device is described which prevents, during deployment of an ocean cable system, torque build-up in a heavy armor cable section from being abruptly applied to a next-connected light armor cable section. A set of helically-wound steel armor rods rigidly attached to the heavier cable section form a tube-like extension over the first several feet of the lighter cable. The rods resist rotation because of their frictional contact with the cable engine drum. The enveloped cable within the rod-tube device accordingly rotates only as much as the tube. The torque-induced rotation that does occur is well within that safely permitted per unit cable length.

11 Claims, 4 Drawing Sheets

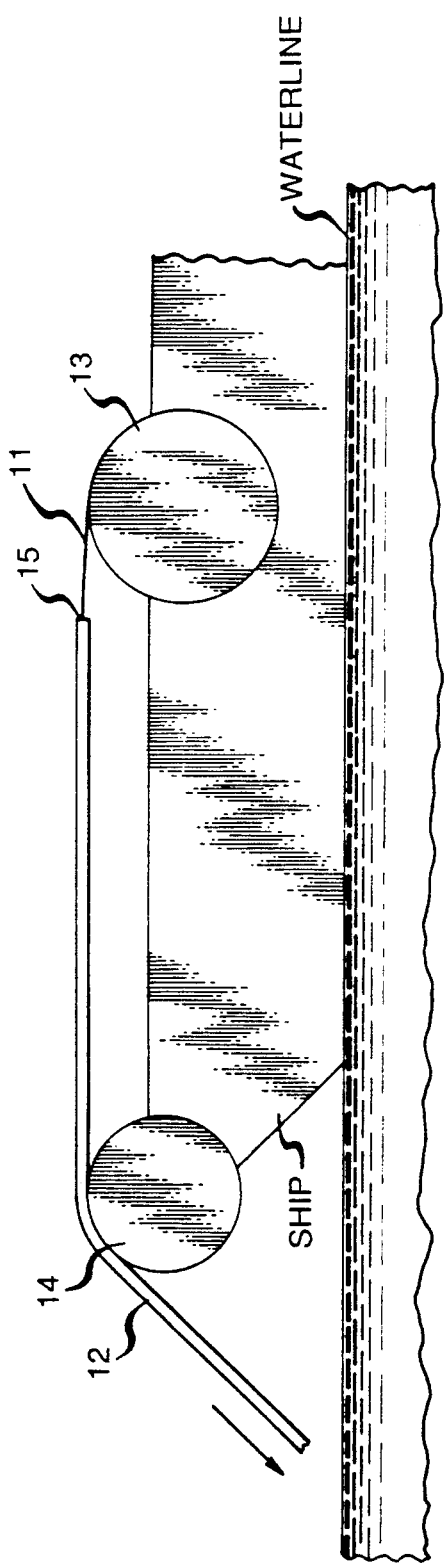
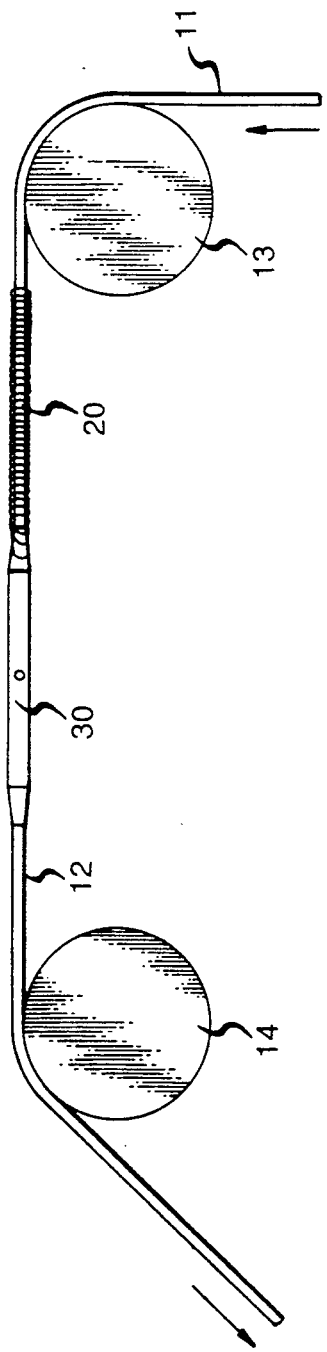

$\tau$ = RESULTING TORQUE
$M_r$ = RADIAL NORMAL LOAD
$F_f$ = FRICTION FORCE

APPARATUS FOR AVOIDING TORQUE BUILD-UPS IN DEPLOYING OCEAN CABLE

FIELD OF THE INVENTION

This invention relates to undersea cable deployment, and more particularly, to the transitioning of a cable-to-cable junction consisting of a torque-balanced section and a non-torque-balanced section of cable traveling between the cable engine sheave and the overboarding sheave without damaging the torque-balanced section.

BACKGROUND OF THE INVENTION

Modern undersea armored cable systems sometimes require the connection of a torque-balanced section to one that is not torque-balanced. An example of such a transition is the connection of a medium armor (MA) non torque-balanced cable to a light armor (LA) torque-balanced cable.

During the deployment of such transitions, considerable stress can be generated by the heavier, non-torque balanced section and imparted through the junction into the lighter torque-balanced section. This stress is manifested as the transition travels on board ship over the cable engine drum and moves toward the overboarding sheave. As the junction first leaves the cable engine drum, the full value of torque existing in the higher torqued medium armor cable will be imparted directly to the torque-balanced light armor cable and must be absorbed over an extremely short length of cable. The latter is thereby caused to rotate beyond its acceptable torsional strain limit.

Depending on the structural differences between the two cable sections and the axial load momentarily incident at the cable transition, the torque-induced rotation can be substantial. For example, in this particular MA/LA transition rotations in excess of 400 degrees can occur. The resultant stress in the lower torqued, less torsionally rigid cable, can be substantial because this torque-induced rotation takes place over a very short length of the less resistant cable as it disengages from the cable engine drum. Permanent and possibly undetected strain damage can easily result, which undermines the structural and functional integrity of the entire cable system.

Accordingly, one object of the invention is to provide a transition device that allows deployment of cable systems comprising sections of differing torsional rigidities and structures from a cable tank into the ocean, with decreased risk of twist damage due to sudden torque-induced rotation.

A further object of the invention is to allow the deployment of an ocean cable consisting of sections having differing armor layers while avoiding the risk of twist damage due to sudden torque-induced rotation.

An additional object of the invention is to allow rapid and positive application of a torque restraining device, either at the cable manufacturing factory prior to shipment, or on board ship just prior to deployment.

A specific object of the invention is to permit spreading or distribution of torque-induced rotation over a substantial length of a less resistant cable section.

SUMMARY OF THE INVENTION

Elimination of twist-induced damage to a less torsionally rigid cable section is achieved, pursuant to the invention, by a device which prevents the torque build-up in a heavy cable section from being abruptly applied to a short section of a light cable section at the transition point between the two cable sections. In its simplest form, the device consists of a set of steel armor rods rigidly attached to the heavier cable section, which form a tube-like extension over the initial several feet of the lighter cable section. As long as the tube formed by the rods remains in contact with the cable engine drum, the tube is rotation-resistant even though the torque buildup in the heavier cable section is imparted to the tube. As increasing lengths of the lighter cable pay out, only a slight rotation of the rod-tube structure takes place. The rotation that does occur over the increased length of the lighter cable, is well distributed, controllable, and most importantly, non-damaging.

The torque restraining device, hereinafter referred to as a Transition Torque Relief Device ("TTRD") in one embodiment comprises an array of helically-wound steel armor rods connected to the rigid cable junction member that is normally installed at the transition point between the two cable sections. The armor rod set extends over a predetermined length of the lower torqued, less torsionally stiff cable.

Pursuant to the invention, only when the armor rods move out of contact with the cable engine drum, does the torque build-up induced by the heavier cable finally release. The energy release is applied, however, to the length of lighter cable within the tube envelop provided by the armor rod TTRD applique, and not, as in the prior art, to a short length of the lighter cable.

The armor rod diameters and length can be sized to reduce the transfer torque and twist in virtually any size of cable containing higher torsional energy build-up to an acceptable level when the cable transition junction is well beyond the cable engine drum. Advantageously also, rods of a preselected diameter are preformed to a desired helical pitch and inner diameter. The rods are inserted into receiving holes of a flange portion of the cable junction, to which the non-torque balanced cable is rigidly connected. Rod insertion may be performed on board ship during the cable-laying or repair operation, or at the cable manufacturing facility.

The mechanism on which the rods depend to achieve the foregoing, is the tube-like behavior of the helically-wound applied rods, in combination with the metal-to-metal friction between the armor rods and the surface of the cable engine drum. That frictional force or traction has been determined to be more than sufficient to limit and delay the torque-induced rotation.

In a variation of the inventive idea, an initial layer of smaller-diameter helically-wound filler rods are first applied over the cable to be protected. The inner filler rods make intimate contact with both the cable and outer tube rods acting to further assure that no damaging rotation occurs as the beginning of the less torsionally rigid cable first transitions over the cable engine sheave.

The invention, its further objects, features, and advantages are elucidated in the description to follow of an illustrative embodiment.

DESCRIPTION OF THE DRAWING

FIG. 1 is a schematic diagram showing deployment of an undersea cable system consisting of two structurally different cable sections with the heavier cable being overboarded first;

FIG. 2 is a schematic diagram showing the device of the present invention being used in the deployment of two connected cable sections of differing torsional rigidities;

DETAILED DESCRIPTION OF AN ILLUSTRATIVE EMBODIMENT

Figure 3:
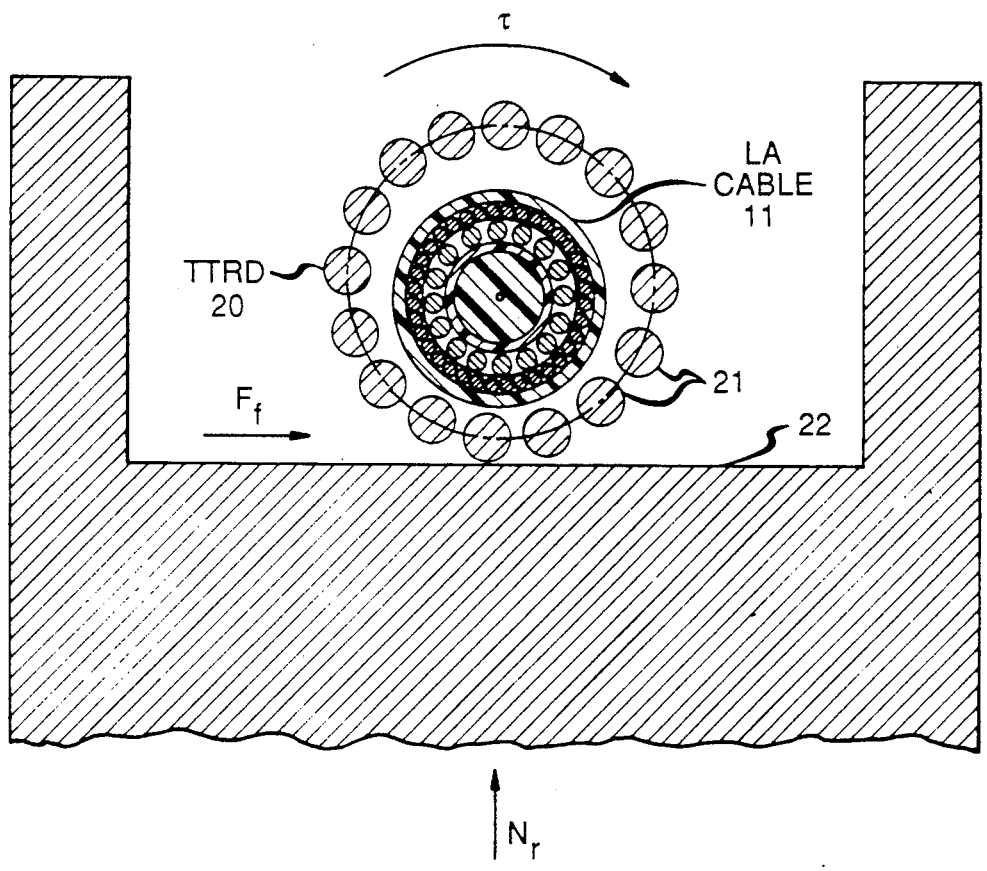
FIG. 3 is a schematic diagram showing a cross-section of a specific Transition Torque Relief Device (TTRD) TTRD formed by armor rods which envelop the light armor cable section and contact a cable engine drum.

A review of the pertinent engineering mechanics associated with the TTRD will aid in understanding the need for the present invention and its functionality. More particularly, the following analysis demonstrates why, in a medium armor (MA) to light armor (LA) cable transition, it is necessary to provide some means to prevent induced rotations to the less torsionally stiff and stress-resistant cable section. The analysis further shows how the particular inventive embodiment illustrated below functions to provide the protection.

Tension and torque in a helically-wound layer of armor rods are mathematically coupled through the following relationship:

$$\begin{Bmatrix} T \\ \tau \end{Bmatrix} = \begin{bmatrix} (AE) & K_{T\tau} \\ K_{\tau T} & (JG) \end{bmatrix} \begin{pmatrix} \Delta u/l \\ \Delta \phi/l \end{pmatrix} \quad (1)$$

where
T = The applied tension
$\tau$ = The resulting torque
(AE) = The effective axial rigidity
(JG) = The effective torsional rigidity
$K_{T\tau} = K_{\tau T}$ = The coupled axial torsional stiffness coefficient
$\Delta u/l$ = Axial elongation per unit length
$\Delta \phi/l$ = Rotation per unit length Of these variables, it is the coupling coefficient that forces the two equations in the matrix to be linearly dependent, producing a relatively complex relationship.

During deployment of a MA/LA transition, when the MA cable (alone) is subjected to tension between the sheaves, rotations in the MA cable are prevented due to the traction between the cable and sheaves. The traction is the result of the radial normal force ($N_r$) and the friction force ($F_f$) at the interface. The MA cable, which is not torque balanced, will develop torque in the presence of tension if the cable ends are rotationally restrained. Under this condition the complex relationship in Equation 1 reduces to:

$$\tau = \frac{K_{\tau T}}{(AE)} T \quad (2)$$

For this case, the torque is directly proportional to the applied tension.

If the MA cable ends are not rotationally restrained in some manner, as in the case when the MA/LA transition leaves the cable drum, the MA cable will have relative rotations occur between its ends.

FIG. 1 illustrates deployment from a cable-laying ship of an undersea cable consisting of a light armor section 11 and a medium armor section 12. During deployment, the cable transition travels over a cable engine drum 13 and then over a bow sheave 14. The drum 13 and sheave 14 are typically separated on board ship by about 100 feet. Cable section 12 is under tension from the weight of heavier overboarded cable. That tension is present in the length of cable between the drum 13 and sheave 14.

If cable section 12 is non-torque-balanced, the tension causes substantial torque build-up. Torque-induced rotation of section 12 is prevented, however, due mainly to the traction between the cable 12 and the drum/sheave surfaces 13, 14. This traction is the result of the radial normal force $N_r$ and the friction force $F_f$ at the interface between the cable and drum/sheave surfaces, as illustrated in FIG. 3. Since the cable ends (not shown) are rotationally restrained by the confining of the cable system as it is deployed, the complex relationship of Equation (1) above reduces to that of equation (2). In this case, the torque present in cable section 12 is directly proportional to the tension present.

As seen in FIG. 1, as the two connected cable sections pay out, there comes the point where the end 15 of cable section 12 is no longer rotationally restrained by frictional contact with cable drum 13. If cable section 11 is not sufficiently robust to resist an applied torque, rotation will occur in section 11. The full magnitude of the induced rotation is applied directly to a very short length of cable section 11, as can be seen by reference to FIG. 1.

Figure 4:
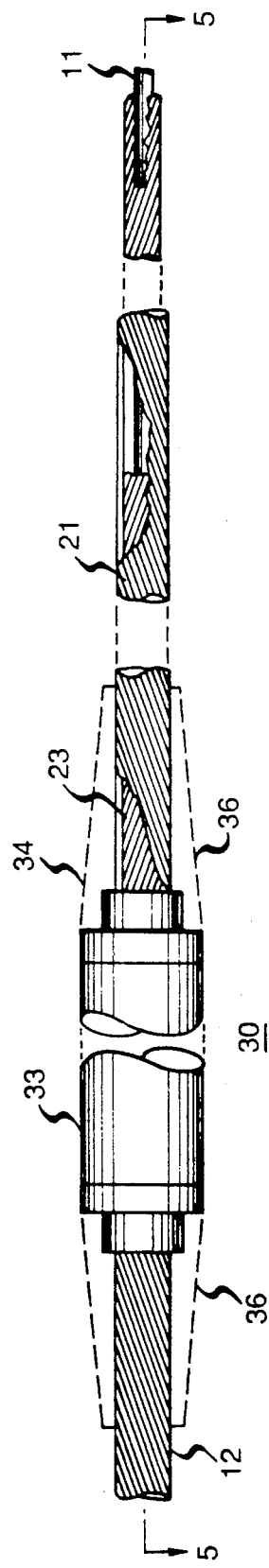
FIG. 4 is a sketch showing a side view of two connected cable sections, with one section protected by the inventive armor rods and, optionally, by an inner layer of filler rods.

Referring to FIGS. 2, 3, and 4, rotational energy is absorbed over an arbitrarily long length of cable section 11 by the TTRD of the present invention. The TTRD, denoted 20, consists of a plurality of steel armor rods 21 inserted into receiving holes formed in a flange 42 that engages the end portion of assembly 33. In a first embodiment, best illustrated in FIG. 3, helically-wound rods 22 are applied in a tubular helix directly and loosely around an initial portion of cable 11. TTRD 20 does not carry any appreciable axial load, because that load is still carried by cable 11. TTRD 20, however, serves the purpose of relieving cable 11 of the induced torsional load to eliminate twist-induced damage to cable 11.

FIG. 4 illustrates the cable-to-cable junction member 30 which mechanically connects the two non-uniform cable sections 11, 12. Junction 30 consists of strength by-pass assembly 33 and two strain relief end members 36. These are shown in fuller detail in FIG. 5, which shows assembly 33 comprising an elongated tube fabricated of beryllium-copper, with end flanges 41 that are provided with interior threads. Four torque pin grooves 39 are provided in the interior surface of assembly 33, each extending inwardly one or two inches from the end of assembly 33. Grooves 39 are formed 90 degrees apart; two such grooves 39 are shown in FIG. 5.

Cable 11 is rigidly terminated to a cable anchor 32. The termination may, for example, be achieved by fanning the light armor wires of the cable into receiving holes in anchor 32, in a manner not shown but well-known to workers in the art. Anchor 32 includes termination torque pins 38, which engage the grooves 39 when anchor 32 is inserted into the end of by-pass assembly 33.

Figure 5:
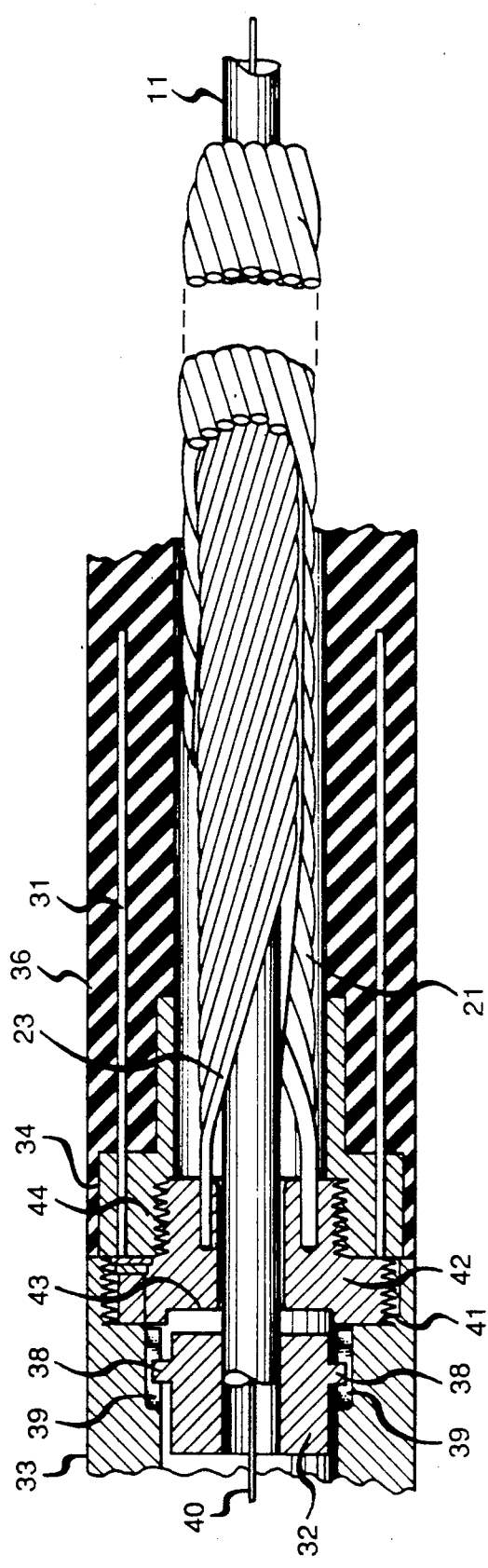
FIG. 5 is a sketch showing a sectional view of the invention, detailing the structure of an illustrative TTRD and its attachment to a typical strength by pass terminal assembly.

As further seen in FIG. 5, the flange 42 includes a bearing surface 43. When the flange 42 is engaged on the assembly 33 and the anchor 32 is in place with its pins 38 in the grooves 39, the axial load is borne by cable 11 and strength by-pass assembly 33 as the end surface of anchor 32 butts against surface 43.

Referring again to FIG. 3, the TTRD tubular armor rods 21 frictionally contact surface 22 of cable drum 13. A normal force $N_r$ is generated by the axial tension caused by the weight of the cable extending to the ocean floor. A torque $\tau$ imparted by the non-torque balanced cable 12 under tension, generates a rotational vector which is substantially countered by the friction component $F_f$ at the interface of drum surface 22 and the contacting armor rods 21.

A variation of the invention, depicted in FIG. 5, employs an inner layer of filler rods 23, which provide the TTRD 20 with increased resistance to rotation. Rods 23 anchor in flange 42 by insertion into a set of receiving holes in flange 42, which are interior and concentric to the holes which receive rods 21. Rods 23 are pre-formed with a helical lay that is opposite in direction to the lay of the armor tube rods 21. Rods 23 envelop cable 11 for a distance of, for example 3-5 feet. The preform inner diameter of filler rods 23 is chosen such that when applied, the helix tightly grips the outer surface of the cable section 21. Further, in this embodiment, the preform inner diameter of the outer armor rods 21 is slightly less than the outer diameter of the installed filler rods 23. Once installed, the armor rods 21 make intimate gripping contact with the filler rods 23, but then extend beyond the ends of rods 23 in a loose-fitting helix around the outer jacket of cable section 11.

Since rods 23 are attached to flange 42 which in turn is rigidly attached to strength by-pass assembly 33, the structural combination further restricts rotation of the cable section 11 as it travels beyond the cable sheave 13.

An advantage of both embodiments of the invention is that the rods 21, 23 and the related apparatus can be installed on board ship as cable deployment proceeds. The process of inserting the rods into their retaining holes takes typically less than an hour, making it particularly suitable for cable repair operations.

Additional strain relief may be afforded through a strain relief member 36 and a bell mouth 34, shown in FIG. 5. Bell mouth 34 is a beryllium copper part having a flange 44 with internal threads to engage external threads on flange 42. Strain relief member 36 is formed of polyurethane, or alternatively, neoprene. A number of strain relief rods 31, for example twelve, with tapered ends (not shown) are embedded in the member 36. The rods 31 and bell mouth 34 are joined as a unit by extruding strain relief member 36 around them in a separate forming process.

As seen in FIG. 4, strain relief member 36 advantageously is formed with a taper which approximates, in its final inside diameter, the outside diameter of the rods 21. The two strain relief members 36 at either end of strength by-pass assembly 33, afford a strain-relieving gradual transition of the assembly depicted in FIG. 4, as it travels over the cable sheave 13 and the bow sheave 14.

Figure 6:
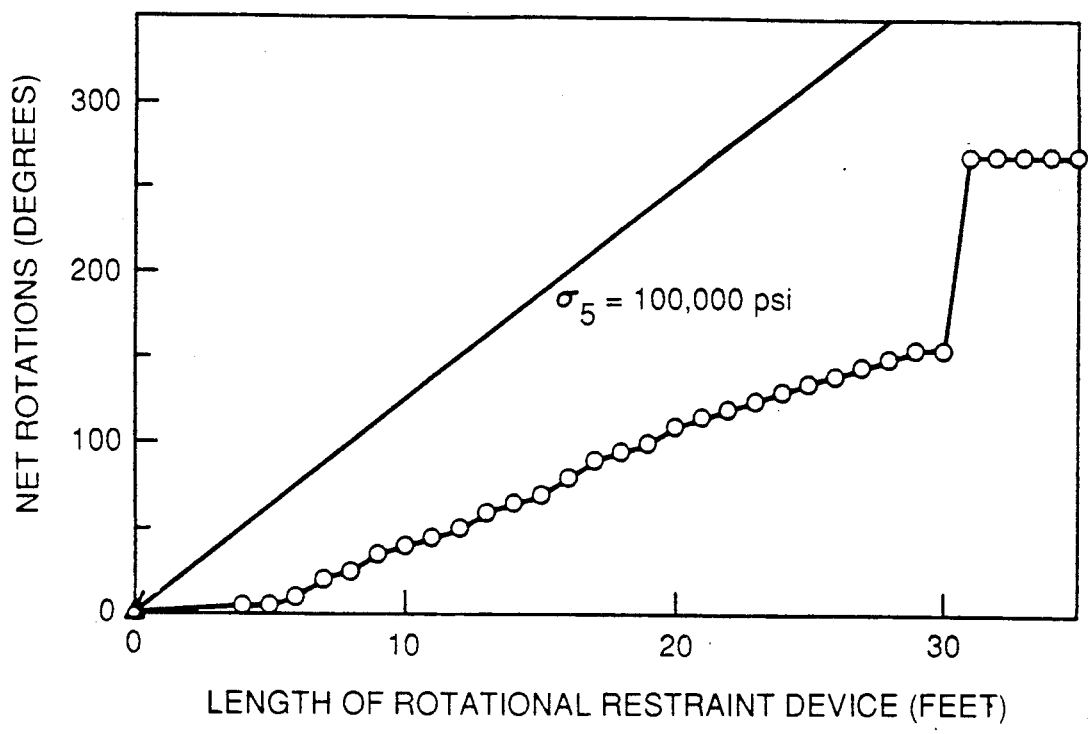
FIG. 6 is a graph illustrating useful design considerations for application of the invention.

FIG. 6 graphically illustrates the twist or rotation that occurs in a cable section protected by the present invention, as a function of how far the protected cable's leading end has traveled from the current point of contact of the rods 21 with the cable drum. If the TTRD 20 is applied over, for example, a 30-foot section of the cable 11, it is seen that the invention creates essentially a 30-foot length of the less rotation resistant cable into which the torque buildup finally relieves. Although the torque build-up will still cause the same degrees of rotation in the cable section 11 as would have been induced in the absence of the inventive device 20, that rotation now is applied to and absorbed by a relatively long section rather than by the short segment of cable between the transition junction and the immediately proximate point on the cable drum 13.

By selecting the rod structure and length to suit a given configuration of cable under a given axial load, the torque-induced rotation per unit length can be maintained to an amount that is within the known bounds of rotation which the cable can sustain without causing damage. The graph of FIG. 6 plots the safe rotation allowed for a particular cable, which in this illustrative case is a specific structure of light armor cable. Pursuant to the design curve of FIG. 6, the safe net rotation for a tension level of 100,000 PSI is shown as a positive straight line plot. For any value of applied tension, the maximum amount of twist that can be tolerated by the exemplary cable will be limited by the stresses experienced by the outer armor layers. The twist limit in the exemplary cable is the amount which causes the tensile stress in the outer layer of armor to be limited to some specified value, for example, one-half of the tensile yield stress or 100,000 psi.

Referring again to FIG. 6, it is seen that in the first few feet of travel of the TTRD 20 over the cable sheave 13, only slight rotation occurs. This is due to the combined rotational restraining effect of the inner rods 23 and the outer rods 21. The net cable rotation experienced is seen to be well beneath the plotted safe permitted rotation for the cable length that has traveled over the cable drum 13. The slope of the plot denoting actual experienced net rotation, is, pursuant to the invention, always less than the linear function depicting safe net rotation.

When the rods of the TTRD 20 finally no longer frictionally engage the sheave surface 22, an abrupt rotation occurs. This is denoted by the step function occurring in the FIG. 6 plot at approximately the 30-foot point. As the torque-induced rotation is imparted, the net rotation is still well below that rotation permitted given the known structure of the cable. A safety factor of two or more, is easily achieved.

Figure 7:
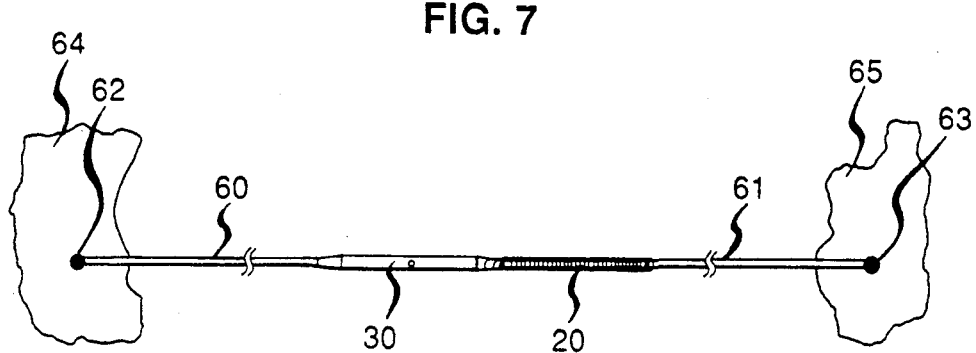
FIG. 7 is a diagram of an underwater cable system deployed with the present invention and extending from one land mass to another.

The TTRD of the present invention becomes a permanent element of the deployed cable system, as depicted in FIG. 7, to which it poses no disadvantage. If a cable deployed with the TTRD installed is later recovered for repairs, the TTRD can be reused. Such a system comprises, for example, first and second cable sections 60, 61, connected through the junction member 30 and protected by the TTRD 20. The system is connected to a first terminus 62 on land mass 64, and a second terminus 63 located on land mass 65. It is understood that the system comprising sections 60 and 61 may also have further sections which are not shown. The land masses 64 and 65 may, for example, belong to two separate nations located on opposite sides of an ocean spanned by an undersea communications cable containing the invention. In such case, the perimeters of the land masses 64, 65 shown in FIG. 7, may constitute respectively national borders with the cable termini 62, 63 each located within its respective national border.

The invention is defined in the scope of the claims to follow.

I claim:

1. Apparatus for restraining rotation of a first communications cable section induced by torque build-up in a connected second communications cable section during ocean deployment comprising:
    a communications cable junction member installed between, and rigidly connecting, the two communications cable sections; and
    a first array of armor rods rigidly connected to a first end of said junction member extending over a predetermined length of said first communications cable section to form a flexible torsionally stiff tube having an operating clearance between the outside diameter of said first cable section and the inside diameter of said tube of armor rods.

2. Apparatus in accordance with claim 1, wherein said first array of rods are formed as a helix.

3. Apparatus in accordance with claim 2, further comprising a second array of wire rods interposed between said first rod array and said first communications cable section surface applied in a helical lay opposite to the lay of said first array.

4. Apparatus in accordance with claim 3, wherein said second rod array is tightly applied to the outer surface of said first communications cable section; and
    said first rod array extends longitudinally and loosely over said first communications cable section substantially beyond the ends of said second rod array.

5. Apparatus in accordance with claim 4, wherein said junction member comprises a flange with first and second rod-receiving holes formed in concentric circular arrays with respect to the axis of said flange, said respective rod arrays being inserted into said holes.

6. In the deployment of an ocean cable comprising two torsionally disparate cable sections rigidly connected by a cable junction member, a method for effecting a delay in the time at which any torque build-up in the second cable section is applied to the first cable section to create a torque-induced rotation of said first cable section as said sections and junction member transition over a cable engine drum and travel toward the bow sheave of the cable-laying ship, comprising the steps of:
    rigidly connecting an array of rods to one end of said junction member and extending said rods helically along a predetermined length of said first cable section to form a flexible torsionally stiff tube having an operating clearance between the outside diameter of said first cable section and the inside diameter of said tube of armor rods; and
    paying out said ocean cable so that a substantial length of said first cable section has transitioned beyond said drum before said drum directly contacts said first cable section;
    said torque-induced rotation of said first cable section occurring only after said rods frictionally disengage from said engine drum.

7. The method of claim 6, including the further step of:
    installing an initial layer of rods in close gripping contact with the surface of said communications cable section, said rod in said initial layer being shorter in length than said rods in said rod array.

8. An undersea communications cable comprising:
    first and second communications cable termini each located within a national border;
    said communications cable including first and second torsionally dissimilar cable sections;
    a cable junction member installed at the transition point between, and rigidly connecting the two cable sections;
    a first array of armor rods rigidly connected to one end of said junction member and extending helically over a predetermined length of said first cable section to form a flexible, torsionally stiff tube enveloping said first cable section, said tube having an operating clearance between the outside diameter of said first cable section and the inside diameter of said tube, for restraining rotation of said first cable section induced by torque buildup in said second connected cable section during deployment of said first and second cable sections; and
    means for communicatively connecting said first and second cable sections to respective ones of said termini.

9. Apparatus in accordance with claim 8, further comprising a second array of armor rods substantially shorter in length than the rods of said first array interposed between said first rod array and said first communications cable section, said second rod array being rigidly attached to said junction member and applied in a helical lay opposite to the lay of said first rod array, said second rods intimately gripping said first communications cable section.

10. Apparatus for restraining rotation of a first communications cable during ocean deployment over a pair of cable ship capstans, said rotation being induced by torque build-up in a second communications cable applied to said first cable through a cable junction member that rigidly joins the two cables, said apparatus comprising:
    a set of elongate armor rods having a length substantially less than the distance between said capstans, said rods extending over a predetermined length of said first communications cable, each rod comprising:
    a first section formed with a predetermined helical pitch and preselected inside helix diameter to envelop a specific outside diameter of first communications cable, and
    a second linearly straight section adapted to engage a concentric ring of receiving holes in said junction member;
    said rods when assembled onto said junction member as a set forming a flexible, torsionally stiff tube over said first cable, said tube having an operating clearance between the outside diameter of said first cable and the inside diameter of said tube of armor rods;
    said tube adapted to delay the application of said torque-induced rotation of said first communications cable as said first cable transitions over the first of said capstans during deployment.

11. Apparatus in accordance with claim 10, further comprising:

a second set of relatively short-length armor rods adapted to extend from said junction member to occupy space formed by said operating clearance, each rod of said second set comprising:

a first section formed in a helical pitch opposite to that of said elongate rods, with an inside diameter approximately that of the outside diameter of said first cable, and a second linearly straight section adapted to engage a second, inner concentric ring of receiving holes formed in said junction member;

said second set of rods when assembled on said junction member over said first cable adapted to form a flexible tube with its inside diameter contacting the surface of said first cable, and its outside diameter contacting the inside diameter of said elongate rods.

* * * * *